April 3, 1973  R. M. MIKULYAK  3,725,008
METHOD OF REGROWING CRYSTALS OF CADMIUM SULPHIDE
FOR SCINTILLATION COUNTERS
Filed May 18, 1970

INVENTOR
R. M. MIKULYAK
BY

ATTORNEY

3,725,008
METHOD OF REGROWING CRYSTALS OF CADMIUM SULPHIDE FOR SCINTILLATION COUNTERS

Robert Michael Mikulyak, Stirling, N.J., assignor to Bell Telephone Laboratories, Incorporated, Murray Hill and Berkeley Heights, N.J.
Filed May 18, 1970, Ser. No. 38,344
Int. Cl. B01d 7/00; C01g 11/00
U.S. Cl. 23—294
7 Claims

ABSTRACT OF THE DISCLOSURE

In order to regrow a mass of small crystals of cadmium sulphide, they are placed at one end of a sealed evacuated tube ($10^{-5}$ torr typically). This end of the tube is held at a temperature which is approximately equal to or slightly greater than the sublimation temperature of the cadmium sulphide crystals, while the other end of the tube is held at a still higher temperature. Thereby, the mass of small crystals is regrown at the same tube site under conditions of solid-vapor equilibrium, and in effect coalesced into larger crystals which are useful as scintillation phosphors to detect gamma rays of the order of 100 kilovolt or more.

FIELD OF THE INVENTION

Figure 1:
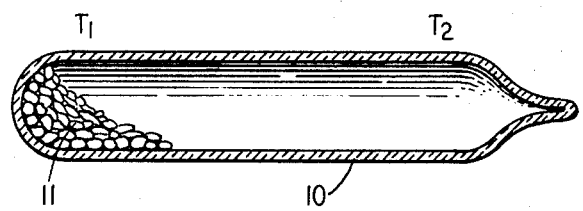

This invention relates to the field of radiation detectors, and more particularly to methods for making gamma ray scintillation detectors.

BACKGROUND OF THE INVENTION

Gamma ray detectors, in the form of scintillation counters, utilize a crystalline material which emits optical radiation in response to incident gamma rays. Such detectors are especially useful in the radioactive tracer and petroleum prospecting arts.

As disclosed in the pending U.S. patent application of W. L. Brown et al., Ser. No. 713,539, filed on Mar. 15, 1968; a crystal of cadmium sulphide doped with tellurium (CdS:Te) is especially suitable as the phosphor in a gamma ray scintillation counter. In that patent application, it was suggested that the CdS:Te crystal be formed by a method previously disclosed in the U.S. Pat. No. 3,462,630, issued to J. D. Cuthbert and D. G. Thomas on Aug. 19, 1969. Such a method involves mixing the vapors of cadmium sulphide and cadmium telluride together in a heated tube, and condensing the resulting vapors in a cooler portion of the tube. The CdS:Te crystals thereby grown by condensation have the advantage that the concentration of tellurium in these crystals is uniform and can be well controlled. However, the thickness of the crystal grown by that method was only of the order of 1 mm., whereas the range of penetration of energetic 100 kilovolt gamma rays in the CdS:Te crystal is of the order of 1 cm. Thus, only a small fraction of the incident 100 kv. gamma ray energy is transferred to the crystal of 1 mm. thickness and thereby converted into light. Therefore, it would be desirable to have a method for making such crystals of a thickness of the order of 1 cm. or more, in order to obtain a higher efficiency in the gamma ray detection process of energetic gamma rays.

SUMMARY OF THE INVENTION

Figure 2:
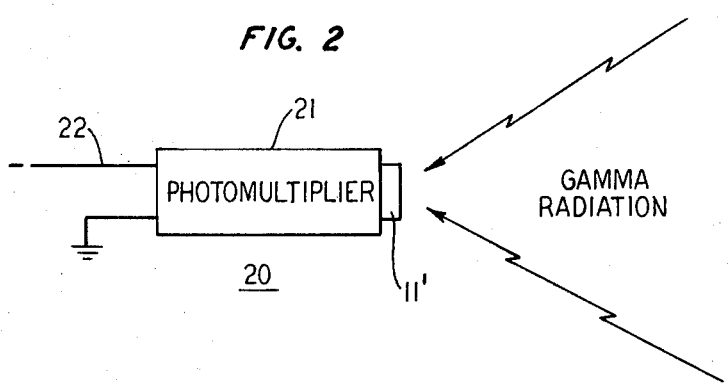

Small crystals of cadmium sulphide, doped with tellurium, for example of the kind grown by the method of the U.S. Pat. No. 3,462,630, are in effect regrown ("coalesced") to form a larger crystal suitable for use as the phosphor in a gamma ray (100 kv. or more) scintillation detector. This is accomplished by first placing the small crystals in one end of a tube. The tube is then evacuated and sealed, and the tube is shaken so that the crystals are located at one end of the tube. This end of the tube is then heated and maintained at a temperature in the range of about 930° C. to 1030° C., that is, approximately at or slightly above the sublimation temperature (about 920° C.) of the crystals in the charge; while the other end of the tube is maintained at a higher temperature. Thereby, for a period of typically about 10 to 100 hours, the crystals are located at the cooler end of the tube which is provided with a temperature gradient. As a result, larger crystals are regrown in the cooler end of the tube, typically in the form of monocrystalline cadmium sulphide. The regrown large crystals have essentially the same doping concentration of tellurium as the original vapor grown small crystals. The ease with which the doping concentration of tellurium can be well controlled in the vapor growing process, together with the equality of this doping concentration before and after the regrowth process of this invention, affords this invention the advantage of providing larger cadmium sulphide crystals with a well-controlled doping concentration. These regrown crystals also have no tendency to conform or adhere to the walls of the tube, and are therefore easily available for utilization as scintillation phosphors, for example. This invention, together with its features, advantages, and objects may be better understood from the following detailed description when read in conjunction with the drawing in which:

FIG. 1 illustrates the method for regrowing crystals, according to a specific embodiment of the invention; and FIG. 2 is a diagrammatic view of a scintillation counter using the crystals grown in accordance with the invention.

DETAILED DESCRIPTION

As shown in FIG. 1, a sealed evacuated tube 10 contains a charge 11 of crystals of tellurium doped cadmium sulphide. Advantageously, these crystals have been grown previously by a vapor deposition technique as described more fully below. Typically, the tube 10 has a diameter of about 1.2 cm. and a length of about 5 to 15 cm. The left-hand end of the tube 10 is heated to a temperature $T_1$, typically about 960° C. (i.e., slightly above sublimation temperature of about 920° C.) whereas the right-hand end of this tube (sealed by reason of melting) is heated to a somewhat higher temperature $T_2$, typically about 1030° C. Typically, the pressure in the tube 10 is about $10^{-5}$ to $10^{-6}$ torr, prior to heating, but higher pressures can also be used. The temperatures $T_1$ and $T_2$, respectively, are maintained for a period of between about 10 to 100 hours, typically for about 60 hours. Thereby, the charge 11 of small crystals in effect coalesces to form larger crystals, and ultimately a single crystal if the heating is continued long enough.

It should be stressed that the tellurium concentration of the crystals regrown in the sealed tube 10 is essentially the same as the tellurium concentration in the crystals as grown earlier by the vapor deposition process. Thus, the tellurium concentration in the regrown crystals can be controlled by the previous vapor deposition technique used to form the charge 11.

In order to gain some understanding of the coalescing process taking place in the method illustrated in FIG. 1, an experiment was performed in which two polycrystalline rectangular cubes of cadmium sulphide were placed touching each other at approximately 960° to serve as the charge 11. After 16 hours each of the two cubes became well faceted, thereby indicating that each had become a single crystal; and although they were still touching each other, they were not welded together. Further treatment at this temperature for 64 hours resulted in one large crystal with continuous facets the full length thereof. Thus, it appears that the crystalline rearrangement process within each cube has a faster rate than the coalescence process itself.

Using a typical crystal 11' (as shown in FIG. 2), formed by the coalescence process described above, it was possible to detect gamma rays of over 120 kilovolt energy with an efficiency of the order as high as that for detection of $\alpha$ and $\beta$ radiation. Prior to such coalescence, the vapor grown crystals used as the charge 11 were so thin that 120 kilovolt gamma rays traversing such crystals could not be detected, although 10 kilovolt gamma rays could be detected.

As shown in FIG. 2, a crystal 11' of tellurium doped CdS, which has been regrown as just described in connection with FIG. 1, is used in a gamma ray scintillation counter 20. In operation, gamma radiation incident upon the crystal 11' produces light therein. This light passes into a photomultiplier tube 21, which converts the light into an electrical output signal in wire lead 22 indicative of the gamma radiation.

In order to grow the original charge 11 of cadmium sulphide crystals, a vapor deposition technique is utilized similar to that described in U.S. Pat. No. 3,462,630, issued on Aug. 19, 1969, to J. D. Cuthbert and David G. Thomas. Close control over the tellurium doping concentration in these crystals can be obtained by using a three-zone furnace. Argon gas is passed at a rate of the order of 300 cubic centimeters per minute through a quartz tube which passes through all three zones of the furnace. In order to improve the quality of the crystals, advantageously a halogen gas, typically chlorine, is also injected along with the argon gas through the tube. For the purpose of tellurium doping, cadmium telluride at a temperature of about 900° C., or tellurium itself at a temperature of 400° C., is contained within a boat in the tube in the first zone of the furnace. Thereby, the cadmium telluride or the tellurium vaporizes, and is carried with the argon gas into the second zone of the furnace. This second zone is maintained typically at a temperature of approximately 1100° C. Within the tube in this second zone is located a boat containing cadmium sulphide which, at this temperature, evaporates and is mixed in with the flowing gas. The third zone of the furnace is maintained typically at a temperature of approximately 900° C., at which temperature the vaporized mixture of materials in the argon gas stream condenses as a solid deposit on the inner walls of the quartz tube, in the form of cadmium sulphide crystals doped with tellurium (and halogen).

The concentration of tellurium in the cadmium sulphide crystals thus formed is controlled by the temperature in the first zone of the furnace. An increase in temperature in the first zone produces an increase in the tellurium concentration in the vapor deposited cadmium sulphide crystals.

Typically, the distance between the first and second zones of the furnace is about 4 inches, and the distance between the second and third zones of the furnace is about 12 inches.

It is obvious that although the invention has been described in detail with respect to regrowth of cadmium sulphide doped with tellurium and chlorine, this invention is applicable to other types of dopants.

I claim:
1. A method of growing cadmium sulphide crystals which comprises the steps of:
   (a) growing a plurality of crystals by vapor deposition;
   (b) placing the plurality of crystals in a tube at a first portion thereof;
   (c) evacuating and sealing the tube; and
   (d) maintaining the temperature of said first portion of the tube at a temperature approximately equal to or greater than the sublimation temperature of the crystals, while maintaining the temperature of another second portion of the tube at a higher temperature than the first portion, for a predetermined time whereby the plurality of crystals is regrown under conditions of solid-vapor equilibrium into larger crystals at the first portion of the tube.

2. The method recited in claim 1 in which the plurality of crystals grown are by vapor deposition are tellurium doped cadmium sulphide.

3. The method of claim 2 in which the temperature of said portion of the tube is in the range of about 930° C. to 1030° C. and the temperature of the other portion thereof is in the range of about 960° C. to 1100° C.

4. The method of claim 3 in which the predetermined time is at least 10 hours.

5. The method of claim 4 in which the predetermined time is in the range of about 10 to 100 hours.

6. The method of claim 2 in which the crystals are also doped with a halogen.

7. The method of claim 6 in which the halogen is chlorine.

References Cited
UNITED STATES PATENTS

| | | | |
|---|---|---|---|
| 2,947,613 | 8/1960 | Reynolds et al. | 23—294 |
| 3,104,365 | 9/1963 | Broser et al. | 23—294 |
| 3,210,149 | 10/1965 | Eland | 23—294 |
| 3,243,267 | 3/1966 | Piper | 23—294 |
| 3,362,795 | 1/1968 | Weisbeck | 23—294 |
| 3,462,630 | 8/1969 | Cuthbert et al. | 313—108 |
| 3,519,399 | 7/1970 | Kyle | 23—294 |

FOREIGN PATENTS

| | | | |
|---|---|---|---|
| 923,241 | 4/1963 | United Kingdom | 23—301 |

OTHER REFERENCES

Boyd et al.: "Vaporization-Crystallization Method for growing CdS single crystals," J. App. Phys., vol. 30, pp. 176–179 (1959).

Czyzak et al.: "Synthetic CdS Crystals," J. App. Phys., vol. 23, pp. 932–3 (1952).

WILBUR L. BASCOMB, JR., Primary Examiner

R. T. FOSTER, Assistant Examiner

U.S. Cl. X.R.
23—305; 250—71.5